J. S. DAWLEY.
ART OF MAKING MOTION PICTURES.
APPLICATION FILED AUG. 17, 1914.
1,278,117.
Patented Sept. 10, 1918.
2 SHEETS—SHEET 1.
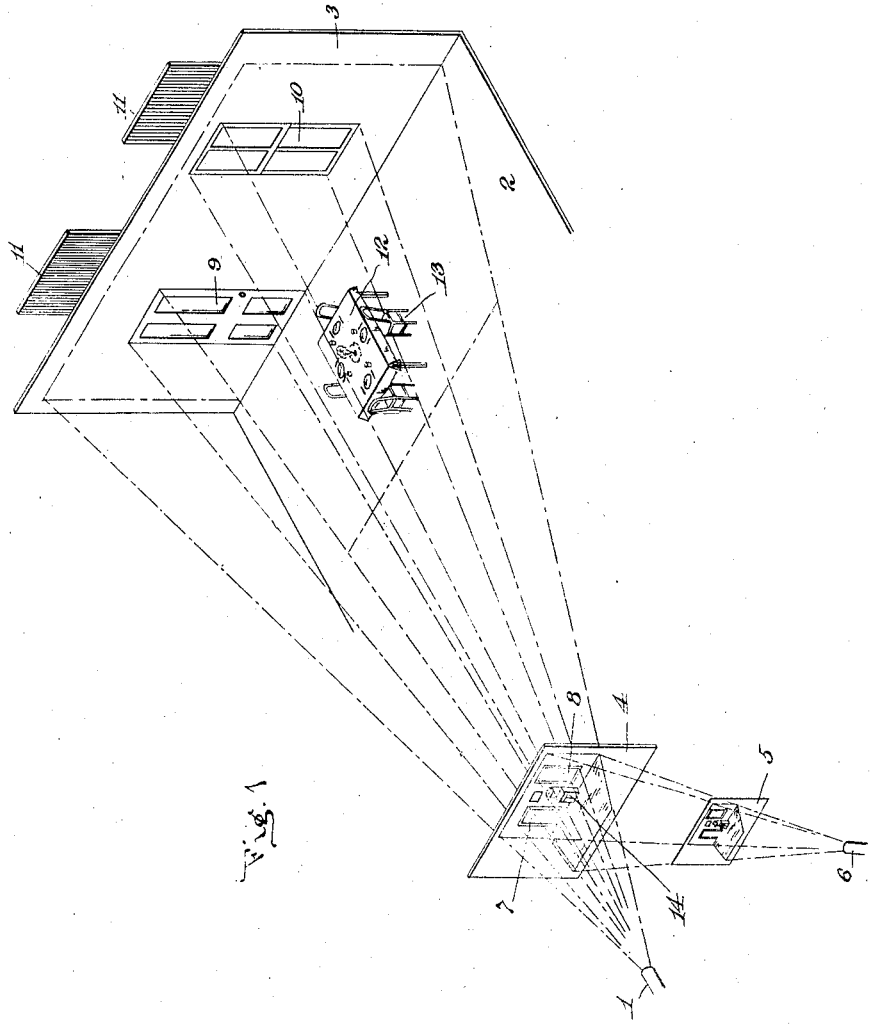
Witnesses:
Inventor
James Searle Dawley
Attorneys.

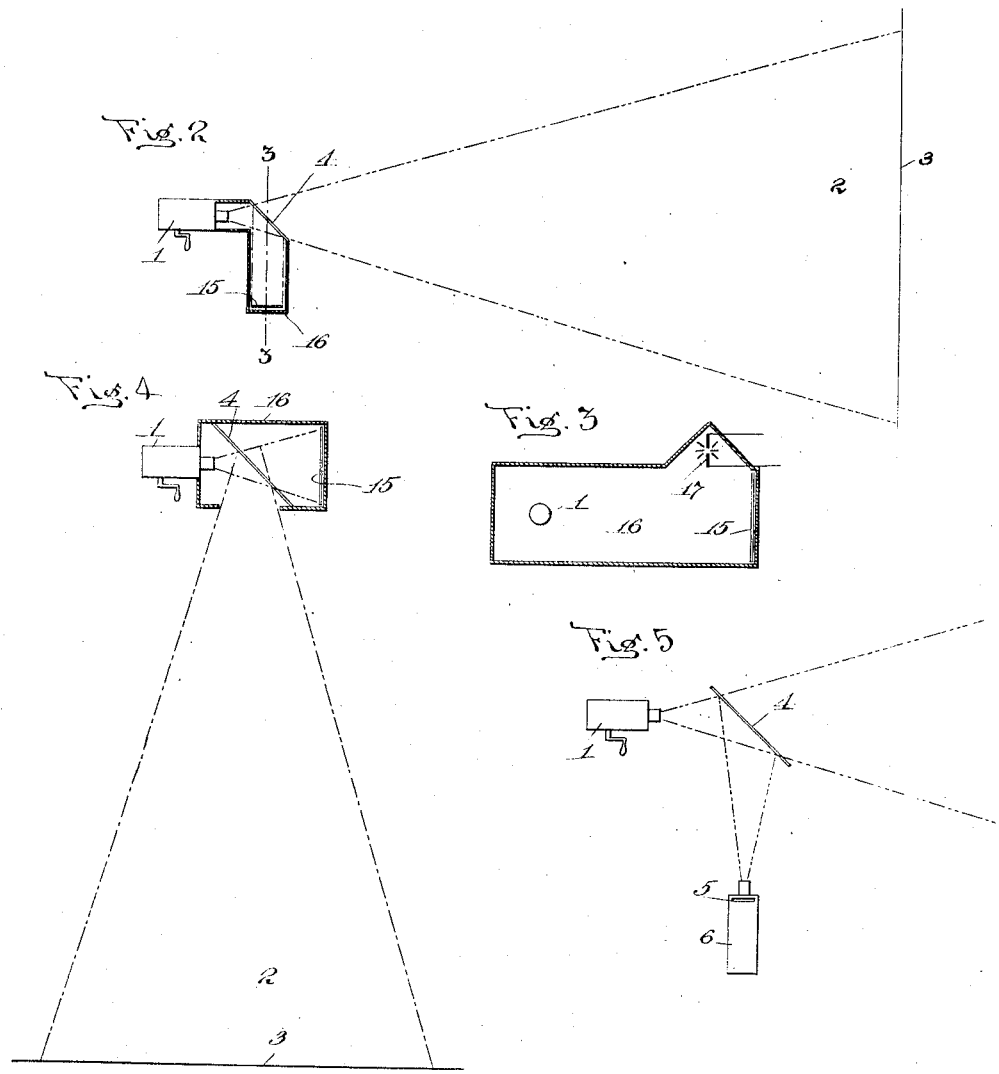

UNITED STATES PATENT OFFICE.

JAMES SEARLE DAWLEY, OF NEW YORK, N. Y.

ART OF MAKING MOTION-PICTURES.

1,278,117.

Specification of Letters Patent.

Patented Sept. 10, 1918.

Application filed August 17, 1914. Serial No. 857,116.

*To all whom it may concern:*

Be it known that I, JAMES SEARLE DAWLEY, a citizen of the United States, residing in the borough of Manhattan, city, county, and State of New York, have invented a certain new and useful Improvement in the Art of Making Motion-Pictures, of which the following is a specification.

My invention relates to improvements in the art of making motion pictures by which their artistic qualities and scope may be substantially increased and their expense very considerably reduced. A considerable part of the expense now incurred in making motion pictures is due to the cost of the sets, drops and other scenery for studio work, not only the actual direct cost of the same, but the indirect cost due to loss of time by actors waiting for the scenery to be constructed. Another considerable source of expense is due to the necessity of transporting companies of actors and other employees to special localities where the needed scenery is found. For instance, if the location of a picture is in Egypt, with the pyramids as a background, or in Switzerland with the Alps as a background, the expense of taking actors, camera men, producers and other employees to those particular localities is very great, to say nothing of the loss of time *en route*. With my invention I do away largely, or entirely, with expensive sets or artificial scenery, and at the same time I obtain photographic effects that are much superior to anything possible with artificial scenery. No matter how skilfully artificial scenery may be constructed it seldom deceives the eye of the observer, and wherever possible the producers of motion pictures utilize natural scenery in order to secure the maximum artistic effect. Furthermore, with my invention I am enabled to secure the same or practically the same effects in a studio that can be obtained from natural settings, and thereby enormously extend the scope of the art, while at the same time very greatly reducing the expense. In other words, I am enabled to secure the same effects in a studio that may be obtained by actual photography of any natural scene, no matter how far removed it may be, and I am able to obtain the effect under maximum photographic conditions.

At the present time, should a motion picture company desire to secure a picture in Egypt, for example, not only is the work very expensive but results are frequently uncertain. The atmospheric conditions may be bad; a long period of rain may exist; negative film may be spoiled by climatic conditions; if the negative is developed on the spot there are practical difficulties against securing the best results, and if returned to the studio for development it may spoil or deteriorate in transit.

All of these difficulties are avoided by my invention, since I am enabled to take pictures in the studio with the same effect as if they were secured in any country or location of the world; in fact, wherever a still photograph can be secured I am enabled to lay a scene for a motion picture in that locality with precisely the same degree of perfection as if the actual actors were transported to the place and were operating under ideal conditions.

I accomplish these objects by utilizing photographic images of the sets or scenery instead of using real sets or real scenery, the photographic images being photographed either directly, or by reflection, or by projection, or jointly directly, reflectively or projectively. In making a picture the photographing of the actors who are enacting the story or plot, and the photographing of the photographic image constituting the back-ground or set may be effected either simultaneously or successively. When both are effected simultaneously there will be obviously secured a single negative giving to the eye the same effect as if the actors were placed in front of or with respect to the actual set or scenery. When both are effected successively the negative may be first exposed to take photographs of the actors and properties in front of a black back-ground and then the negative again exposed to take photographs of the photographic set or scene as in so-called "double exposure," or instead a negative may be first secured of the actors and properties in front of a black back-ground and said negative then developed, and a second negative be then secured depicting the photographic back-ground. From two such supplementary negatives positive prints can be secured by superimposing the negatives and printing directly through both of them, or by first printing from the first negative with the black background and then printing from the second negative.

Preferably I effect the photographing of the actors and the photographing of the photographic image representing the set or back-ground by a single operation, not only because of its simplicity and economy, but also because better results can thereby be secured and the dangers of fogging negative film by double exposure of the same will thereby be avoided.

In addition to utilizing a photographic image to constitute the set or back-ground I can make use of real properties, such as chairs, tables, etc., with respect to which the actors will move and which will be photographed simultaneously with the photographing of the actors. I am also enabled to make use of door-ways, windows and other exits by providing the same in the back-ground located coincidentally with their location in the photographic image, so that although the back-ground is merely a photographic image, yet exits and entrances can be made to give precisely the same effects to the eye as if the back-ground were substantial reality.

I may also make use of real doors and windows, which may be opened and which will be arranged co-incidently with the door-ways and window openings in the photographic image. In fact, in these respects my invention opens up an almost endless field of possibilities that can be developed by ingenious camera men and producers.

My invention can be carried out in a number of ways, some of which will be briefly referred to.

For example, the camera may be directed at a black back-ground, the stage being also suitably blackened. On the stage may be placed the necessary properties, such as tables, chairs, pianos, side-boards or any other desired object; a short distance in front of the camera, and at an angle of about 45° from its optical axis will be placed a sheet of plain glass, through which the actors and properties will be photographed directly. Upon the glass will be projected the photographic image of the desired set or scene, such as the interior of a room or office or warehouse. The image thus projected on the glass will be adjusted so that its floor line will co-incide with the floor line of the stage, so that although the actors walk and move on the black stage they appear to move on the floor of the projected image. The image may be maintained on the glass by direct reflection from a photograph held some distance in front of the glass and properly illuminated, or the image may be projected upon the glass by converting the photographic set or scene into a lantern slide and projecting light rays through the same upon the glass. The light which illuminates the photographic image and the light which illuminates the actors and sets will be so proportioned as to give the effect to the eye of the actors moving in and with respect to the real scene. By now operating the camera the negative will be a composite consisting of the photographic image on the glass plate reflected or projected from the photographic set or scene, and photographic images of the real actors and properties superimposed thereon. By directly illuminating the photograph of the desired set or scenes and reflecting the same on the glass plate, light effects can be obtained that will more clearly simulate actual conditions than when the image is projected as above explained, because it becomes possible to illuminate the photograph more intensely at one point than at others, as will be obvious to those skilled in the art.

Instead of carrying out my invention as above explained the conditions described may be reversed; in other words, the desired photograph of the set or scene may be placed beyond the glass plate so as to be photographed directly by the camera, while the actors and properties may be reflected on the glass plate and the reflected images photographed by the camera.

Or instead I may secure the same general effect, though not so well or economically, by a process of simple double exposure; in other words, the actors and properties will be first photographed in front of a black back-ground, after which the negative will be exposed to take the photograph of the desired set or scene thereon, or instead, as I have before indicated, two negatives may be secured, one of the actors and properties in front of the black back-ground and the other of the photographic set or scene and positives obtained from the two negatives either by superimposing the same and printing directly through both, or by successively printing from the two negatives on to the positives, as in double exposure.

In order that my invention may be better understood attention is directed to the accompanying drawings, etc.

Figure 1, is a diagrammatic perspective view illustrating the principle of my invention, and showing an arrangement wherein the reflected image in front of the camera is projected by light through a lantern slide.

Fig. 2, a diagram showing an arrangement in which the image is directly reflected.

Fig. 3, a section of the line 3—3 of Fig. 2, showing a conventional means for illuminating the photograph.

Fig. 4, a diagram showing the reverse arrangement in which the photograph of the set or scene is photographed directly and the actors and properties are photographed by reflection, and Fig. 5, a diagram of the arrangement of Fig. 1, wherein the photograph of the set or scene is projected instead of reflected.

In the above views corresponding parts are represented by the same numerals.

The general principle of my invention can best be understood from Fig. 1, in which 1 represents a motion picture camera of any suitable type, 2 the stage on which the actors move, 3 the back drop, 4 a sheet of plain glass with as perfect a surface as possible and as thin as may be without affecting its stiffness, mounted at an angle of about forty-five degrees with respect to the optical axis of the camera lens. 5 a lantern slide carrying the photographic image of the desired set or scene, such as the interior of a room for example, and 6 a projection lantern for projecting the photographic image upon the plate 4 as shown. The back drop 3 and stage floor 2 are blackened and the image on the glass plate 4 is so adjusted as to make the floor of the image coincide with the stage floor, so that actors moving on the latter will appear to be moving on the floor of the photographic image.

To illustrate the possibilities of the invention I show the image on the plate as having a doorway 7 and a window opening 8.

The back drop 3 will be provided with a door 9 and window 10, arranged to coincide with the doorway 7 and window opening 8 of the image, so that entrances and exits can be made, giving a real effect. Back of the door and window in the drop 3 may be placed two black screens 11, 11, to cut off light rays from entering the same. Any desired properties may be placed on the stage floor such as the table 12 and chairs 13. If desired representations of properties may be carried by the photographic image, such as the side board 14. Viewing the image on the plate 4 with the door 9, window 10 and properties 12 and 13, will give the effect to the eye, and therefore, to the camera 1, of a room equipped with a door, a window, a sideboard, a picture on the wall and a table with chairs. If actors now appear on the stage floor and are properly lighted, preferably from the side and front, to balance the lighting of the image on the plate 4, they will appear to be in the room, they may handle the properties exactly as with ordinary studio work and may make their exits and entrances in exactly the same way. At the same time, I have secured the desired effect without scene painting and at a minimum expense, and have secured a better effect, since a photograph of a real room is better than the usual studio set. Of course, the invention is not limited to inside scenes. Photographs of any locality, a wharf, a city street, a public building, a monument, a country lane, a field, and an endless variety of others, may be made use of by any camera man of the ordinary skill and experience.

Referring now to Fig. 2, I show diagrammatically the camera 1, stage floor 2, back drop 3, and glass plate 4, but instead of a lantern slide, I show a photograph 15 of the desired set or scene, reflecting its image on the plate 4. A casing 16 covers the camera lens, plate 4 and photograph 15, so as to exclude extraneous light rays, and the photograph is illuminated by a light 17, shown in Fig. 3, as an electric light. With this arrangement, the photograph 15 may be illuminated in any special way, so as to cause the light to fall thereon from any special direction, to enhance the effect.

In Fig. 4, a reverse arrangement is shown, the photograph representing the set or scene being observed directly through the glass plate 4 and the back drop 3, stage 2, actors and properties being reflected on the plate, so as to be superimposed on the photograph.

In Fig. 5, I show a diagram of the same arrangement as in Fig. 1, a lantern slide 5 of the set or scene being projected on the glass plate 4 by a projecting lantern 6.

With the arrangements heretofore described, the photographing of the actors and properties and the photographing of the photographic image of the set or scene, directly as in Fig. 4, reflectively as in Fig. 2, or projectively as in Figs. 1 and 5, will be effected simultaneously, and, of course, the illumination of the photographic image and of the actors and properties will be so adjusted that the composite result will give the desired artistic effect. In practice, the illumination of the actors—on which the attention of the observer will be principally focused—will slightly preponderate, without however wiping out or making unduly faint the image of the set or scene.

As before indicated the photographing of the actors and properties and the photographing of the photographic image may be effected successively. For instance, if the set is arranged as shown in Fig. 1, the plate 4, being removed and photographs taken of the actors in front of the black drop 3, and then after such exposure, the film is again exposed to take pictures of the photograph representing the set or scene, a composite negative will be secured, from which, after developing, positive prints may be obtained. Or instead, a negative may be obtained showing the actors and properties in front of the black drop 3, and said negative be then developed, and a second negative be made of the photograph of the set or scene and the second negative then developed; and from the two negatives thus secured, positive prints can be obtained by superimposing the two negatives, one over the other, and printing upon the positive films through both negatives, or instead, such positive prints may be secured by first printing on the positive stock from the negative of the actors and properties with the black background, and then, before developing, printing a second time on the positive stock from the negative of the photograph of the set or scene, and finally developing the positive print so obtained.

Having now described my invention, what I claim as new therein and desire to secure by Letters Patent, is as follows:

1. The art of making motion pictures, which consists in effecting photographic images of a photograph of a set or scene on the negative and in effecting photographs of actors and properties supplementing the same, the images of the photograph being photographed at such a point in the field of view or range of the camera as to be relatively small and at the same time to properly merge with the larger field covered by the living actors, substantially as set forth.

2. The art of making motion pictures, which consists in effecting photographic images of a photograph of a set or scene on the negative and in simultaneously effecting photographs of actors and properties supplementing the same, the images of the photograph being photographed at such a point in the field of view or range of the camera as to be relatively small and at the same time to properly merge with the larger field covered by the living actors, substantially as set forth.

3. The art of making motion pictures, which consists in effecting photographic images of a photograph of a set or scene on the negative and in effecting photographs of actors and properties supplementing the same, the images of the photograph being photographed at such a point in the field of view or range of the camera as to be relatively small and at the same time to properly merge with the larger field covered by the living actors, the photographing being effected by simultaneous reflection and directly, substantially as set forth.

4. The art of making motion pictures, which consists in effecting photographs of a reflected image of a photograph of a set or scene on the negative and in effecting directly photographs of actors and properties supplementing the same, the reflected image of the photograph being photographed at such a point in the field of view or range of the camera as to be relatively small and at the same time to properly merge with the larger field covered by the living actors, substantially as set forth.

5. The art of making motion pictures, which consists in effecting photographic images of a photograph of a set or scene on the negative and in superimposing thereon photographic images of actors and properties supplementing the same, the images of the photograph being photographed at such a point in the field of view or range of the camera as to be relatively small and at the same time to properly merge with the larger field covered by the living actors, substantially as set forth.

6. The art of making motion pictures, which consists in effecting photographic images of a photograph of a set or scene on the negative and in effecting photographic images of actors and properties supplementing the same in front of a black background, the images of the photograph being photographed at such a point in the field of view or range of the camera as to be relatively small and at the same time to properly merge with the larger field covered by the living actors, the floor line of the images of the photograph coinciding with the stage on which the actors move, substantially as set forth.

7. The art of making motion pictures, which consists in effecting photographic images of a photograph of a set or scene on the negative and in effecting photographic images of actors and properties supplementing the same in front of a black back-ground having openings therein corresponding with those in the photograph of the set or scene to secure exit and entrance effects, the images of the photograph being photographed at such a point in the field of view or range of the camera as to be relatively small and at the same time to properly merge with the larger field covered by the living actors, the floor line of the images of the photograph coinciding with the stage on which the actors move, substantially as set forth.

This specification signed and witnessed this tenth day of August, 1914.

JAMES SEARLE DAWLEY.

Witnesses:
 MARY VAN HORN,
 FRANK L. DYER.